June 22, 1943. J. R. E. SANDSTRÖM 2,322,545
DEVICE FOR CHANGING THE pH OF FERMENTESCIBLE LIQUIDS
Filed March 22, 1939
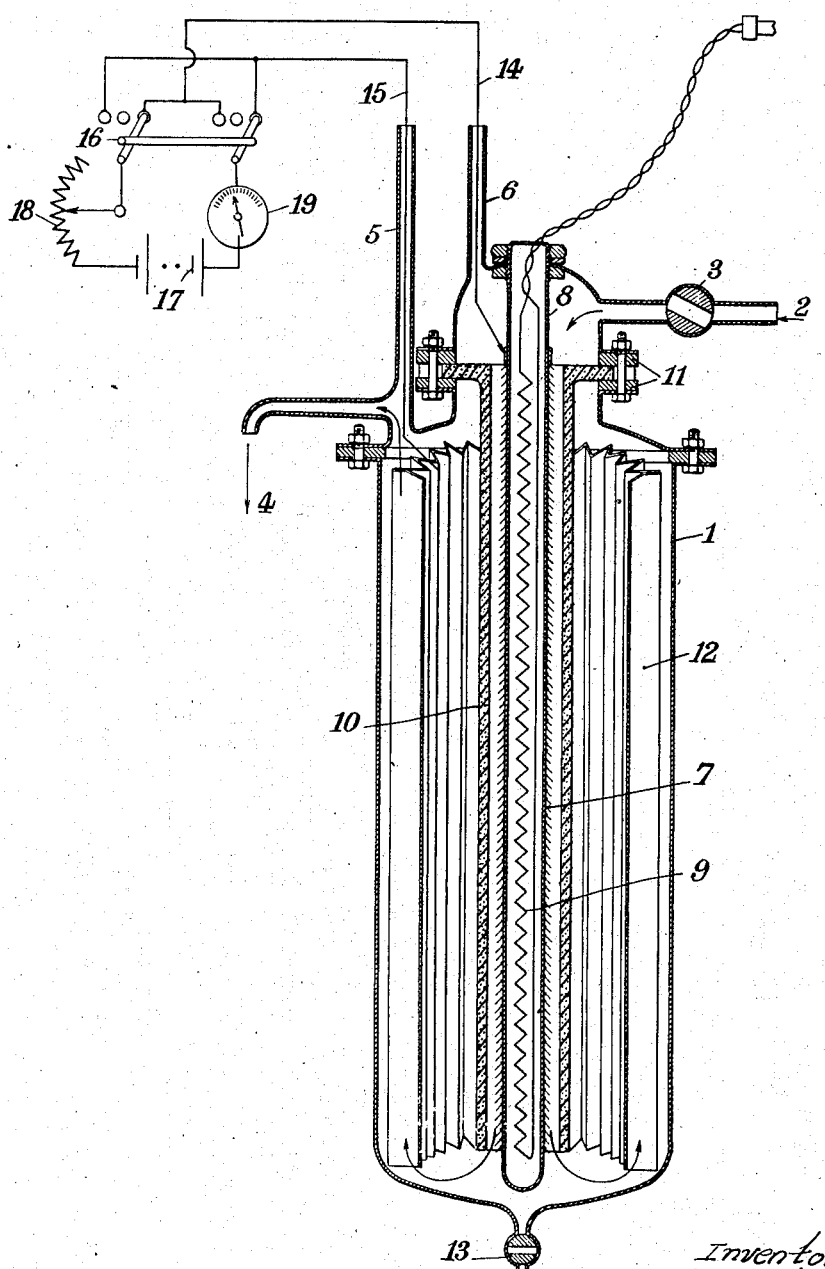
Inventor;
J. R. E. Sandström
By: Glascock Downing & Seebold
Attys.

Patented June 22, 1943

2,322,545

UNITED STATES PATENT OFFICE

2,322,545

DEVICE FOR CHANGING THE pH OF FERMENTESCIBLE LIQUIDS

Jacques Robert Emmanuel Sandström, Saint-Tropez, France; vested in the Alien Property Custodian Application March 22, 1939, Serial No. 263,490 In France March 25, 1938

1 Claim. (Cl. 204—228)

The present invention has for its object a device for carrying into practice, in a particular manner, a process for reviving and activating alcoholic fermentation in incompletely fermented liquids based on the simultaneous utilisation, in a zone located in the midst of the fermentescible mass, of the activating properties of fermentation resulting from an optimum temperature and real acidity.

This device is equally adapted to revive and to accelerate the alcoholic fermentation of fermentescible liquids or to reduce and eliminate said fermentation.

It is already known that, by suitably modifying in the vicinity of the active electrode, the concentration of the positive or negative ions, that is to say, the pH value or real acidity of the liquid, the activity of the fermentation is modified; according to the initial value of the real acidity of the liquid to be treated, it is necessary to increase or to diminish this value; for that purpose, the active electrode can operate either as anode, or as cathode, the modification of the concentration of the ions in the vicinity of the electrodes being, moreover, function of the continuous difference of potential applied between them.

Now, the modification of the concentration in ions is greatest in the vicinity of the electrode of smaller area; by giving to the inactive electrode an area as great as possible relatively to that of the active electrode, only a negligible modification of the pH is determined in the vicinity of said electrode in the reverse direction to that which is to be used in the vicinity of the active electrode.

Consequently, according as the active electrode operates as cathode or anode, it will create in its vicinity a zone in which the liquid has an ionic acidity favorable or unfavorable to the activity of the ferment; in particular, the unfavorable action can determine the destruction of the ferment if it lasts a sufficiently long time with a suitable ionic acidity; by the simple action of a bipolar reverser can therefore be determined either an activation of the fermentation, or a sterilization of the fermentescible liquid.

This sterilizing action is of the greatest interest in a certain number of industries utilising fermentescible liquids, as it allows of avoiding the addition of antiseptic products or the destruction of certain useful products owing to a too high increase of the temperature during pasteurization.

The device forming the subject-matter of the present invention allows of obtaining this double result: either an activation of the fermentation, or the sterilization of the fermentescible liquid.

This device essentially comprises two concentric electrodes having areas suitably determined according to the pH of the fermentescible liquid to be treated and separated from each other by a screen made of porous material, in such a manner that all the liquid introduced and circulating first along the central electrode, then circulates in the vicinity of the second electrode; a difference of potential, the direction and amplitude of which can be varied at will is applied to said electrodes.

In a particular form of construction of this device, the central electrode of smaller area is constituted by a known device having a rough outer surface and internal heating. The second electrode of larger area, or inactive electrode, is advantageously constituted by a pleated surface, so as to make the latter as large as possible, the whole of the device being enclosed in a cylindrical vat.

The accompanying drawing illustrates, by way of example, in longitudinal section, a form of construction of the device according to the invention.

A cylindrical and metallic vat 1, internally covered with an enamel unattackable by the liquid, constituted by several parts assembled with the interposition of fluid-tight plastic packings, comprises a nozzle 2 for the admission of the liquid, provided with a control valve 3, an outlet nozzle 4 for the liquid treated and, at its upper part, two tubes 5 and 6 for the escape of the gases which may be evolved during the operation. A cock 13 is provided at its lower part for emptying the vat.

Within said vat is arranged according to its axis, the electrode 7 secured on a tube 8 rigid with the vat 1 at its upper end; said electrode 7 is hollow and encloses a heating device 9.

A tube 10 made of porous material, the upper base of which is alone coated with enamel, in order to avoid any leaking of the liquid between the plastic packings 11, surrounds the electrode 7. The porous material is of such quality that it allows the easy passage of the ions through the wall of the tube whilst offering a great resistance to the passage of the liquid.

The electrode 12 is arranged at the periphery of the vat 1 and thus completely surrounds the electrode 7 and the porous tube 10. This electrode made, as the electrode 7, of metal or an alloy unattackable by the ionic acidity of the liquid, comprises a pleated surface in order to have a surface of contact with the liquid as great as possible.

The electrodes 7 and 12 are connected by wires 14 and 15 passing through the tubes 6 and 5 to a bipolar reverser 16 connected to the terminals of a source of direct current 17 and comprising a rheostat 18 and a milliamperemeter 19.

The operation of the device is as follows:

It is proposed, for instance, to sterilize a fermentescible liquid the degree of real acidity of which has been determined by a previous measurement; this acidity has been found, for instance, to be higher than that corresponding to the maximum promoting fermentation. The result sought for being sterilization, an unfavorable action of the device will be obtained, tending to further increase said real acidity; the reduction of the pH having for result an increase of the concentration in positive hydrogen ions, by a suitable operation of the reverser 16, the electrode 7 will be taken as anode and the electrode 12 as cathode.

The liquid admitted through the nozzle 2 circulates in the annular space comprised between the tube 8 supporting the anode 7 and the porous tube 10.

According to the known process, in the liquid is created an electric field under the action of which the dissociation of the ions takes place, and the concentration of the positive hydrogen ions increases in the vicinity of the anode 7 which pushes them back through the porous vessel 10 towards the cathode 12 on which they discharge and give neutral molecules. This action suitably prolonged by a given speed of circulation of the liquid and taking place under a suitable difference of potential, progressively diminishes the value of the pH in the liquid sheath comprised between the tubes 8 and 10 and produces its complete sterilization.

The liquid thus sterilized rises along the cathode 12, on which it abandons the excess of positive ions it may draw along with it.

The surface of the cathode 12 being much larger than that of the anode 7, the pH of the liquid is substantially the same as that it has when it is admitted at 2 and, consequently, the liquid issues from the apparatus through the nozzle 4 with an ionic acidity equal to that it had when entering therein.

If necessary or useful, to the action due to the modification of the ionic acidity can be added that due to an increase of the temperature of electrode 7 by means of the heating device 9, suitably adjusted so as not to destroy the useful products it is desired to preserve in the liquid.

The circulation of the liquid in the apparatus can be obtained either by gravitation, or by a pump provided with a by-pass.

It is easy to understand that this apparatus, by a simple reverse operation of the bipolar reverser 16 which would have reversed the polarity of the electrodes, would operate, in the conditions chosen above, as an accelerator of fermentation.

It is to be understood that the invention is not in any way limited to the form of construction illustrated and described which has been given by way of example only. This form of construction, in which the area of the electrode 12 is much larger than that of the electrode 7 is suitable in the case when it is particularly desired to activate the fermentation.

But, if the result sought for is the reduction of fermentation and particularly the sterilization of the liquid, it is advantageous to suitably proportion the areas of the electrodes so as to obtain, in the immediate vicinity of each of them, reverse modifications of the ionic acidity such that the corresponding pH is as far as possible, more or less, from the limits between which the microorganisms of fermentation can manifest their biological activity.

In the immediate vicinity of both electrodes will thus be obtained a double action unfavorable to the activity of the ferment and so much the more intense as, under the action of the direct electric current circulating between them, the pH of the liquid in contact with the anode will be nearer to the value zero, while the pH of the liquid in contact with the cathode will be nearer to the value fourteen.

As the modifications of the pH in the immediate vicinity of the electrodes are in direct proportion to the density of the direct electric current to each of them, and, consequently, in reverse function to the amplitude of their area, it is easy to determine the ratio which must exist between the amplitudes of the areas of the cathode and of the anode, when the pH of the liquid to be treated is known, in order to cause the latter to tend towards zero by contact with the anode, at the same time as it approaches the value fourteen at the cathode, under the action of a current of increasing intensity.

The following example allows what is stated above to be clearly understood.

If the liquid to be treated has an acid reaction and has a pH equal to 4, for instance, it is necessary to reduce the latter to the extent of 4 units at contact with the anode, at the same time as it will increase to the extent of 10 units at contact with the cathode, in order to obtain the maximum ionic acidity at the anode and the maximum ionic basicity at the cathode. For this it is necessary that the dimensions of the electrodes should be proportioned in such a manner that the following ratio is obtained:

Anode surface : cathode surface = 10 : 4 = 2.5

In these conditions an increase of 2.5 units of the pH is obtained at the cathode for each diminution of one unit at the anode, and the result sought for will be obtained.

It is obvious that with the same ratio of the surfaces of the electrodes as in the above example, but by reversing the direction of the electric current, the same result would again be obtained, by starting from a liquid having a basic reaction and a pH = 10.

It is therefore possible, with the same apparatus, and by the simple action of the electric current reverser, to treat, in order to obtain the reduction of fermentation or the sterilization, either a liquid having an acid reaction, or a liquid having a basic reaction, provided that the pH values of these liquids are located with the same distances from the values zero and fourteen, in reverse directions.

For the treatment of fermentescible liquids having a reaction approximating neutrality, the areas of both electrodes must be equal and each of them can operate indifferently as anode or as cathode.

An apparatus, devised for treating, in order to reduce or sterilize fermentation in a liquid of given pH can also successfully treat liquids the pH of which is slightly different, more or less, than the value for which the ratio between the areas of the electrodes will be fixed. In fact, if ionic saturation is reached at one of the electrodes for a certain intensity of the electric current passing between them, the other electrode will not yet be saturated ionically and in reverse direction. But, by slightly increasing the intensity of the electric current, it is possible to obtain the saturation of the less favored electrode, without prejudice to the saturation of the most favored electrode.

Consequently, the pH of the liquid to be treated can vary within certain limits on either side of the value for which the ratio of the electrode areas has been determined, without prejudice to the satisfactory operation of the apparatus utilised for reducing or sterilizing the fermentation.

Owing to the action of the current reverser and to the admissible allowance for the pH value of the liquid to be treated, it is therefore possible to have only a very restricted number of typical ratios between the electrode areas, to allow of usefully treating liquids having the entire acido-basicity range which may be encountered in fermentescible liquids the fermentation of which is to be reduced or completely stopped.

On the other hand, as the gradient of ionic concentration of the liquid rapidly decreases in proportion as the surface of the electrodes is departed from, it is advantageous, in order to subject all the liquid to the action of a maximum ionic concentration, to restrict as much as possible the space comprised between the walls of the chambers containing the electrodes and the outer and inner surfaces of the latter. But, in order that this restriction should not be prejudicial to the possible output of the apparatus, it will be advantageous to give to the electrodes a cellular texture, allowing the liquid to freely circulate as well within as outside their channels, and without being capable of appreciably leaving their walls.

An electrode made of roved wire satisfies the above mentioned conditions of cellular texture, as well as the electrode 12 made of pleated sheet metal illustrated.

However, with this latter device, it is advantageous to use a sheet metal plate which has been perforated before pleating it, so as to allow the ions to freely pass by the shortest path into the liquid comprised between both electrodes, and to thus ensure a constancy of the density of the current at the surface of the entire electrode.

The electrode devices made of roved wire or of perforated and pleated sheet metal, are given only by way of examples, and are not in any way limiting; any other devices allowing to obtain the same result can be adopted.

The invention is particularly applicable to alcoholic fermentation, when the device is used for accelerating the fermentations; it applies to all fermentations of bacterial or microbial origins, when the device is used for reducing the fermentation or sterilizing the liquids.

What I claim as my invention and desire to secure by Letters Patent is:

In an electrolytic device for modifying the concentration of the positive or negative ions in the vicinity of the active electrode, the combination of a vessel, a substantially cylindrical electrode open at both ends, placed in the vicinity of the periphery of said vessel, a cover on said vessel and in which is provided a central orifice, a vertical tube leading from said cover for the escape of the gases, a lateral pipe-line leading from said cover, a cylindrical screen interiorly of said cylindrical electrode made of porous material in said vessel and stopping at some distance above the bottom of said vessel, means for adjusting the upper end of said screen in a fluid-tight manner on the central orifice of said cover, a cap having a central opening and means for adjusting said cap in a fluid-tight manner on the upper end of said screen made of porous material, a vertical tube leading from said cap and a lateral pipe-line leading from said cap, and an electrode interiorly of said cylindrical screen in the form of a hollow rod arranged at the center of said vessel and having a rough outer surface.

JACQUES ROBERT
EMMANUEL SANDSTRÖM.